3,288,746
ZINC-ALUMINUM PAINTS
Lothar Kluth, Hallein, Austria, assignor to Walter Marx
& Co., K.-G., a limited partnership of Austria
No Drawing. Filed Apr. 12, 1961, Ser. No. 102,396
Claims priority, application Austria, Apr. 12, 1960,
A 2,881/60
1 Claim. (Cl. 260—37)

This invention relates to zinc paints having improved protective coating characteristics and, more particularly, to a zinc paint in which part of the zinc pigment is replaced by an aluminum pigment.

One of the principal disadvantages of the presently available commercial zinc paints is that they show a considerable disintegration of the zinc film coating, which disintegration emanates particularly from the surface of the coating. Extensive research has been conducted to find an agent which could be incorporated in the paint composition to effectively retard this disintegration. For example, by increasing the proportion of the binding agent contained in a zinc paint, it is possible to improve the film characteristics but only at the expense of decreasing the cathodic protective effect of the paint. There appears to exist an upper limit to the extent which the amount of binding agent may be added to the system, above which limit any further increase in binding agent severely reduces or even eliminates altogether the cathodic effectiveness of the zinc paint. This upper limit, therefore, constitutes a limit on the extent to which the coating characteristics of a zinc paint can be achieved by increasing the amount of binding agent in the system.

I have found that improved coating characteristics superior to those heretofore known can be obtained, without appreciably impairing the cathodic protective effectiveness, through partial substitution of aluminum for zinc in the zinc paints. By this substitution, the diffusion of gases and liquids through a coating of the paint can be controlled, and thereby improving its resistance to moisture and preventing blistering. I have also found there is a critical limit to the extent to which aluminum can be substituted for zinc and combined with the binding agent without diminishing the cathodic effectiveness of the paint. Based on these discoveries, the invention provides an improved zinc-aluminum paint for applying a protective coating to metal surfaces which comprises a paint vehicle in which there is dispersed (a) from about 60 to about 98 percent by weight of a finely divided zinc pigment, (b) from about 2 to about 40 percent by weight of a finely divided aluminum pigment, and (c) a resinous binder for the metal pigments.

The base material of the zinc-aluminum paints of the invention is a finely divided zinc pigment of 99.97 percent purity, which is prepared by atomizing molten zinc with compressed air so that it forms a coarse powder. This relatively coarse zinc powder is then ground to very fine leaflets, the grinding being controlled to produce zinc pigment having the desired specific surface area. Alternatively, a zinc powder may be prepared by distillation and subsequent condensation, which results in a particle having a spheroidal structure.

The finely divided aluminum pigment which is incorporated in the zinc-aluminum paints of the invention is prepared by grinding and milling aluminum in ball mills with the addition of lubricants. The thickness of both the zinc and aluminum leaflets is ordinarily below 0.5 micron and preferably in the range from about 0.1 to about 0.5 micron. These pigments are mixed with a resinous binding agent, such as cyclocautchone, polystyrene, epoxy resins polyaminoamide resins, and the resultant mixture then dispersed in a standard paint vehicle.

The following examples are illustrative of the new zinc-aluminum paints of the invention. In each of these examples, the type number represents the percentage of binding agent in the paint. For example, Type 20 paint contains 20 percent binding agent and 80 percent metallic pigment. The percentage of aluminum and zinc in the metallic pigment are set forth next to the type number.

Table I sets forth seven different paints in which the zinc pigment possessed a leaflet structure, while Table II sets forth three additional examples in which the zinc pigment possessed a globular or spheroidal structure.

TABLE I.—EXAMPLES IN WHICH ZINC POSSESSES A LEAFLET STRUCTURE

| Type No. | Zinc | Al |
| --- | --- | --- |
| 12 | 92 | 8 |
| 15 | 90 | 10 |
| 20 | 87 | 13 |
| 24 | 84 | 16 |
| 30 | 80 | 20 |
| 40 | 74 | 26 |
| 50 | 70 | 30 |

TABLE II.—EXAMPLES IN WHICH ZINC POSSESSES A GLOBULAR STRUCTURE

| Type No. | Zinc | Al |
| --- | --- | --- |
| 4 | 98 | 2 |
| 8 | 95 | 5 |
| 10 | 94 | 6 |

I claim:

In a zinc aluminum paint of the type suitable for applying as a protective cathodic coating to a metal surface and having a paint vehicle in which there is dispersed a metallic zinc and aluminum pigment system and a binder for the pigment, the improvement in combination thereof comprising a zinc aluminum pigment system having from about 60% to about 98% by weight of a lamellar substantially pure zinc pigment, and from about 2% to about 40% by weight of a lamellar aluminum pigment, said lamellar zinc and aluminum pigments being about 0.1 to 0.5 micron thick.

References Cited by the Examiner

UNITED STATES PATENTS 2,263,603  11/1941  Ziehl _____ 106—290
2,299,034  10/1942  Reynolds _____ 106—290
2,968,571  1/1961   Lanz _____ 260—38 XR

FOREIGN PATENTS 801,986  9/1958  Great Britain.
846,902  8/1960  Great Britain.

OTHER REFERENCES

Mattiello, "Protective and Decorative Coatings," vol. II, 1942, pp. 382–3 relied on.

Mathewson, "Zinc, The Science . . . ," Reinhold, 1959, pp. 513–523 relied on.

MORRIS LIEBMAN, Primary Examiner.

MILTON STERMAN, ALEXANDER H. BRODMERKEL, Examiners.

A. H. KOECKERT, Assistant Examiner.

UNITED STATES PATENT OFFICE
CERTIFICATE OF CORRECTION

Patent No. 3,288,746                                November 29, 1966

Lothar Kluth

It is hereby certified that error appears in the above numbered patent requiring correction and that the said Letters Patent should read as corrected below.

In the heading to the printed specification, line 6, for "Apr. 12, 1960" read -- Apr. 15, 1960 --; column 1, line 44, strike out "paint." and insert instead -- paints, and that addition of aluminum above the critical limit virtually eliminates the cathodic effectiveness of the paint. --; column 2, line 54, for "Lanz" read -- Lantz --.

Signed and sealed this 12th day of September 1967.

(SEAL)
Attest:

ERNEST W. SWIDER
Attesting Officer

EDWARD J. BRENNER
Commissioner of Patents